United States Patent
Walton

[19]

[11] Patent Number: 6,102,178
[45] Date of Patent: Aug. 15, 2000

[54] VISCOUS ACTUATED BALL RAMP CLUTCH

[75] Inventor: Erlen B. Walton, Farmington Hills, Mich.

[73] Assignee: Eaton Corporation, Cleveland, Ohio

[21] Appl. No.: 09/109,354

[22] Filed: Jul. 2, 1998

Related U.S. Application Data

[63] Continuation-in-part of application No. 08/865,901, May 30, 1997, abandoned.

[51] Int. Cl.$^7$ .............................. F16D 35/00; B60K 17/35
[52] U.S. Cl. ......................... 192/35; 192/57; 192/58.41; 74/650
[58] Field of Search ........................... 192/35, 57, 58.41, 192/70.23, 93 A; 74/650; 180/249

[56] References Cited

U.S. PATENT DOCUMENTS

| | | |
|---|---|---|
| 2,937,729 | 5/1960 | Sperr . |
| 2,947,394 | 8/1960 | Grover .................................. 192/35 X |
| 3,477,302 | 11/1969 | Webb . |
| 3,596,740 | 8/1971 | Nau . |
| 4,562,897 | 1/1986 | Renneker . |
| 4,601,359 | 7/1986 | Weismann et al. . |
| 4,700,823 | 10/1987 | Winckler ............................. 192/107 M |
| 5,012,908 | 5/1991 | Kobayashi et al. ........................ 192/57 |
| 5,070,975 | 12/1991 | Tanaka et al. ............................. 192/35 |
| 5,092,825 | 3/1992 | Goscenski et al. . |
| 5,398,792 | 3/1995 | Teraoka .................................. 192/35 X |
| 5,431,603 | 7/1995 | Aho . |
| 5,464,084 | 11/1995 | Aoki et al. . |
| 5,967,276 | 10/1999 | Leichliter et al. ......................... 192/35 |

*Primary Examiner*—Rodney H. Bonck
*Attorney, Agent, or Firm*—L. J. Kasper

[57] ABSTRACT

A center differential device (17) for use in a four wheel drive system, the device including a viscous coupling (29), a ball ramp actuator (31), and a clutch pack (33). Under normal driving conditions, most of the torque is transmitted to the front drive wheels (11), and the device (17) rotates as a unit. If the front wheels (11) begin to slip, the input shaft (15) and input coupling member (35) rotate faster than the output coupling member (43), thus transmitting torque to the output coupling member (43). This torque is transmitted to the first ramp plate (51) of the ball ramp actuator (31), displacing the actuator from its neutral position (FIG. 3), such that the second ramp plate (52) begins to load the clutch pack (33) and transmit torque from the housing (25) to the output shaft (19), and from there to the rear drive wheels (23). With the present invention, for any given amount of front wheel slip, a predetermined amount of torque may be transmitted automatically to the rear drive wheels (23), the viscous coupling (29) providing a "speed sensitive" input to the ball ramp actuator (31), without the need for any separate controls, sensors, etc.

7 Claims, 1 Drawing Sheet

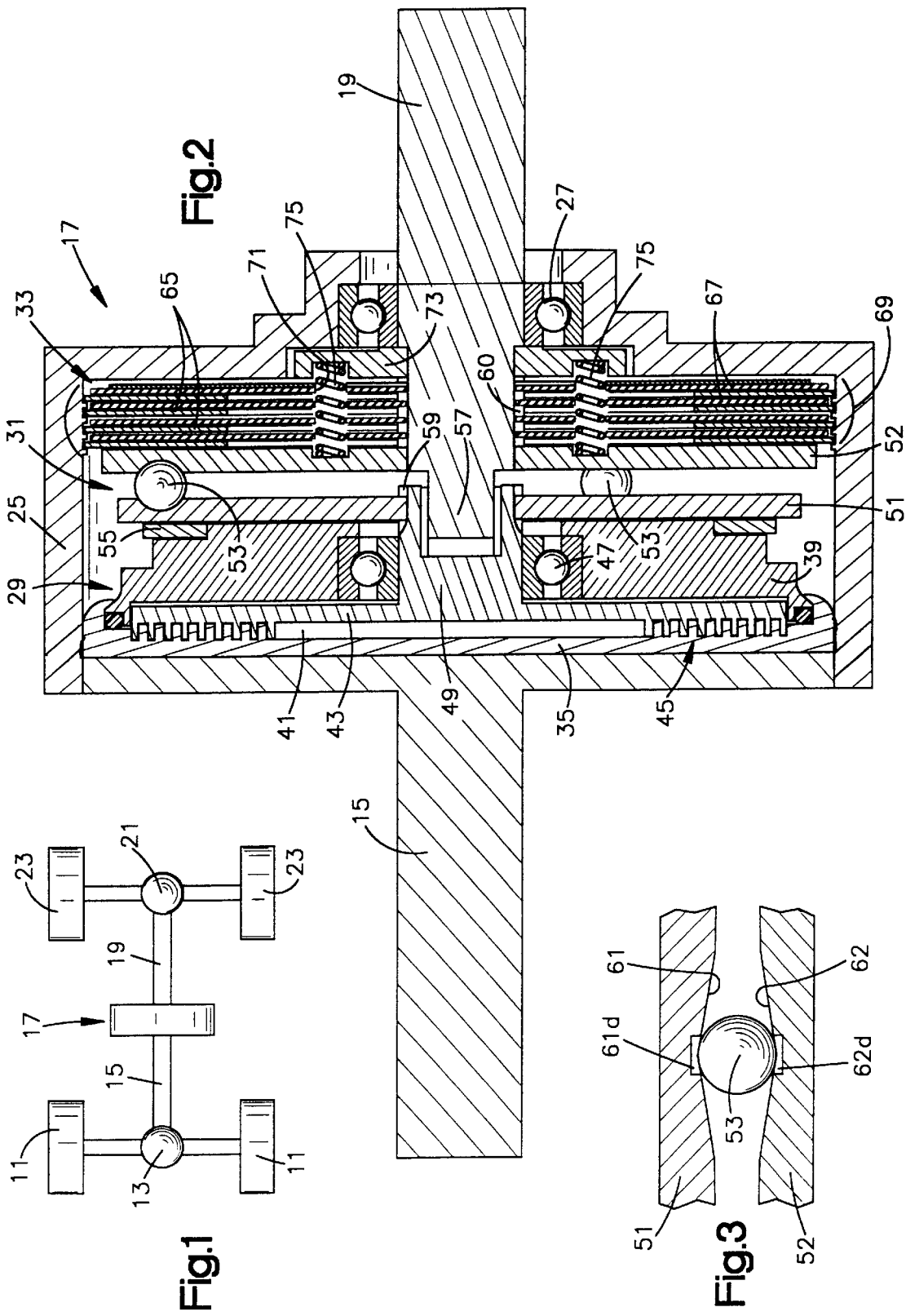

VISCOUS ACTUATED BALL RAMP CLUTCH

CROSS-REFERENCE TO RELATED APPLICATION

This application is a continuation-in-part (CIP) of application U.S. Ser. No. 08/865,901, filed May 30, 1997, now abandoned, in the name of Erlen B. Walton for a "VISCOUS ACTUATED BALL RAMP CLUTCH".

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a driveline system for a four wheel drive vehicle, and more particularly, to a center differential device for use in such a driveline system. The use of the term "differential" does not imply the presence of conventional differential gearing, but instead, the term is used primarily because the device of the present invention replaces the typical prior art center differential. However, it should be understood that the device illustrated, described and claimed herein has uses other than as a center differential.

In many of the vehicles being produced today, the basic vehicle platform is a front wheel drive. However, in many such vehicles, especially in vans and sport utility vehicles, it is considered desirable to be able to provide four wheel drive, at least under certain operating conditions.

Typically, the various arrangements for achieving part-time four wheel drive have been complex and expensive, and in some cases, have required some sort of control scheme to achieve the four wheel drive (or rear wheel drive) in response to certain predetermined operating conditions.

In certain vehicle applications, it is acceptable to provide only front wheel drive under most operating conditions, and rear wheel drive is required only when the front drive wheels are slipping (e.g., under poor traction conditions). However, the prior art has not provided a suitable device wherein only front wheel drive is provided, with no substantial torque being transmitted to the rear wheels, until the front wheels begin to slip.

For example, U.S. Pat. No. 4,562,897 discloses a viscous clutch in the driveline, between the front transaxle and the rear wheels, but requires a selector arrangement in order to choose among transmitting torque through the viscous coupling, or disconnecting the viscous coupling, or bypassing the viscous coupling. Implementation of such a selector arrangement adds substantially to the overall complexity and cost of the driveline system.

It is known from U.S. Pat. No. 5,070,975 and from European Application EP 0 314 420 to use, as a center differential in a four wheel driveline, a viscous actuated ball ramp type friction clutch to transmit torque to the rear axles when there is a speed difference between the front and rear wheels. However, the devices of the cited patent and application have numerous functional problems, stemming in part from the attempt to "incorporate" one ramp plate of the ball ramp actuator into the viscous coupling. For example, rotating seals would be required to separate the viscous fluid from the fluid in the remainder of the device, which is generally considered undesirable from the standpoint of durability.

In addition, it is believed that the torque transmitting capability of the device of the cited patent and application would be somewhat limited by the fact that one of the ball ramp plates comprises the input to the viscous coupling. Finally, this relationship of the ball ramp and the viscous coupling, as described above, would increase the hysteresis of the device as well as the overall friction in the actuator portion of the device, thus adversely affecting the predictability of operation of the device.

BRIEF SUMMARY OF THE INVENTION

Accordingly, it is an object of the present invention to provide an improved center differential device for use in a driveline of a part-time four wheel drive vehicle, wherein the improved device is capable of transferring no substantial torque to the rear wheels until the front drive wheels begin to spin, and thereafter, automatically transfers a substantial amount of torque to the rear drive wheels, i.e., the device is "speed sensitive".

It is another object of the present invention to provide such an improved center differential device which accomplishes the above-stated object without the need for any separate control arrangement, speed sensors, etc., and wherein the device is relatively simple and compact.

It is a related object of the invention to provide an improved center differential device which achieves the above-stated objects, while overcoming the disadvantages of the prior art devices.

The above and other objects of the invention are accomplished by the provision of an improved center differential device of the type including an input shaft adapted to receive input torque, at a speed of rotation representative of the speed of rotation of a pair of primary drive wheels. The device also includes an output shaft adapted to provide driving torque to a pair of secondary drive wheels, and a clutch pack including at least a first friction disc fixed to rotate with the input shaft and at least a second friction disc fixed to rotate with the output shaft. The device includes means operable to move the friction discs between a disengaged position and an engaged position.

The improved center differential device is characterized by the means operable to move the friction discs comprising a cam ramp actuator including first and second ramp plates, and a plurality of cam members, each operably disposed between the first and second ramp plates, and in engagement with first and second ramp surfaces, respectively. The second ramp plate is disposed axially adjacent the friction discs, and is operable to move the friction discs toward the engaged position, the second ramp plate being fixed to rotate with the output shaft. The means operable to move the friction discs further comprises a viscous coupling including an input coupling member fixed to rotate with the input shaft, and an output coupling member. The output coupling member is fixed to rotate with the first ramp plate whereby, any speed difference between the input and output shafts will result in a corresponding slip speed between the input and output coupling members, thus generating a viscous shear torque representative of the slip speed, the viscous shear torque being applied to the first ramp plate to displace the cam ramp actuator from a neutral position to a clutch actuating position.

In accordance with a more limited aspect of the invention, the improved differential device is characterized by the viscous coupling comprising a housing member fixed to rotate with the input coupling member, and being disposed axially between the output coupling member and the first ramp plate. The output coupling member is fixed to rotate with the first ramp plate, whereby, any speed difference between the input and output shafts will result in a corresponding slip speed between the input and output coupling members, thus generating a viscous shear torque representative of the slip speed. The viscous shear torque is applied to the first ramp plate to displace the output of the cam ramp actuator from a neutral position to a clutch actuating position.

BRIEF DESCRIPTION OF THE DRAWINGS

FIG. 1 is a schematic view of a driveline system for a four wheel drive vehicle, including the center differential device of the present invention.

FIG. 2 is an axial cross-section of the center differential device of the present invention.

FIG. 3 is a fragmentary, somewhat schematic view of the ball ramp actuator included in FIG. 2.

DETAILED DESCRIPTION OF THE PREFERRED EMBODIMENT

Referring now to the drawings, which are not intended to limit the invention, FIG. 1 is a schematic of a driveline system for a four wheel drive vehicle, of the type with which the present invention may be utilized. The driveline system of FIG. 1 includes a pair of front drive wheels 11, driven by a front transaxle 13. Extending rearwardly out of the transaxle 13 is an input shaft 15, which typically receives input torque, by means of a right angle gear set (not shown in FIG. 1) in the transaxle 13, such that the speed of rotation of the input shaft 15 is representative of the speed of rotation of the front drive wheels 11

The input shaft 15 is associated with a center differential device, generally designated 17, which includes an output shaft 19, by means of which torque may be transmitted to a rear differential 21, and then to a pair of rear drive wheels 23. Typically, the device 17 could be reversed, i.e., the shaft 19 could be the input and the shaft 15 could be the output, and therefore, the use herein of the terms "input" and "output" will be understood as explanatory and not limiting. As was mentioned previously, it will be understood by those skilled in the art that the term "center differential device" does not mean or imply that the device include a conventional differential gear set, but instead, the term will be understood in its broader sense to mean that the device 17 will permit differentiating action between the input shaft 15 and the output shaft 19. In the subject embodiment, the front drive wheels 11 are the primary drive wheels, and the rear drive wheels 23 are only secondary drive wheels. However, within the scope of the present invention, such could be reversed, i.e., the rear wheels being the primary drive wheels and the front wheels being the secondary drive wheels.

Although the present invention will be described as though the front wheels 11 and the rear wheels 23 normally rotate at the same speed, as the vehicle is travelling straight ahead, those skilled in the art understand that such is typically not the case. For various reasons, such as the fact that the front wheels normally have a smaller rolling radius, the front drive wheels 11 typically rotate somewhat faster than the rear wheels 23. Therefore, in a typical drive system of the type shown in FIG. 1, there is almost always at least some torque being transmitted by the center differential device 17. As a result, the performance requirements for the device 17 are much more stringent than would be the case if the device merely rotated as a "solid" unit for most of its duty cycle.

Referring now primarily to FIG. 2, the center differential device 17 will be described in some detail. The device 17 includes a housing 25, the forward wall of which is shown for simplicity as being formed integrally with the input shaft 15. The housing 25 is rotatably supported, relative to the output shaft 19, by means of a bearing set, schematically shown at 27.

Disposed within the housing 25 the center differential device 17 may be viewed as comprising three separate portions as follows: a viscous coupling 29; a ball ramp actuator 31; and a clutch pack 33. It is one important feature of the present invention that these portions comprise separate, somewhat functionally independent devices, as will become apparent from the subsequent description.

The viscous coupling 29 includes an input coupling member 35, which is fixed to the housing 25, such as by any suitable means, such as "ears" or keys, etc. Also in engagement with the housing 25 is a housing 39, such that the member 35 and the housing 39 cooperate to comprise a totally functional, self-contained viscous coupling, which defines a viscous shear chamber 41. In accordance with another aspect of the invention, no rotating seals (other than those which may be required in bearing sets) are required to separate the viscous fluid in the chamber 41 from the oil in the rest of the device 17, and because the viscous chamber 41 is permanently sealed, the torque versus slip speed of the coupling 29 will be constant and predictable. Disposed within the chamber 41 is an output coupling member 43, and in a manner well known to those skilled in the art of viscous couplings, the input coupling member 35 and the output coupling member 43 define a plurality of interdigitated lands and grooves, generally designated 45. With viscous fluid (typically, a silicone fluid) disposed in the lands and grooves 45, any relative rotation between the member 35 and the member 43 will result in a shear torque being transmitted to the member 43, the difference in speed between the members 35 and 43 typically being referred to as the "slip speed".

Disposed at the radially inner periphery of the housing 39 is a bearing set shown at 47, having its inner race disposed on a shaft portion 49, which is shown in FIG. 2 as being formed integrally with the output coupling member 43. The function of the shaft portion 49 will be described subsequently.

The ball ramp actuator 31 includes a first ramp plate 51, a second ramp plate 52, and a plurality of balls 53, although it should be understood that any form of cam member may be used. Disposed axially between the first ramp plate 51 and the housing 39 is a thrust bearing set 55, and although a device such as a bronze bushing could be used if handling the axial loading were the only concern, it is an important aspect of the invention that the bearing 55 comprise a true "rolling" bearing, such as a needle type bearing. The reasons for this, and the benefits thereof will be described in greater detail subsequently. The shaft portion 49 defines a pilot opening within which is received a forward, pilot portion 57 of the output shaft 19. The shaft portion 49 also includes a set of splines 59, and in splined engagement therewith is the first ramp plate 51. Therefore, the output coupling member 43 of the viscous coupling 29 rotates at the same speed as the first ramp plate 51. The second ramp plate 52 is in splined engagement with a set of splines 60 defined by the output shaft 19, such that the second ramp plate 52 and the output shaft 19 rotate at the same speed.

In a manner well known to those skilled in the art, the first ramp plate 51 defines a plurality of first ramp surfaces 61, while the second ramp plate 52 defines a plurality of second ramp surfaces 62. In FIG. 3, the ball ramp actuator 31 is shown in its "neutral" position, i.e., each of the balls 53 is disposed in the "valley" of each of the ramp surfaces 61 and 62, such that the ramp plates 51 and 52 are at their minimum axial distance from each other, or stated another way, the overall axial dimension of the plates 51 and 52 is at a minimum. As is also well known to those skilled in the art, the neutral position of the ball ramp actuator 31 would correspond, typically, to a disengaged condition of the clutch pack 33. Preferably, the first and second ramp surfaces 61 and 62 include first and second detents 61d and 62d, respectively, such that a very definite, predetermined speed difference (slip speed) within the viscous coupling 29 is required to initiate ramping of the actuator 31, and such ramping will not occur in response merely to the very slight differences which may occur in response to variations in factors such as tire size, etc.

Disposed immediately adjacent the second ramp plate 52 is the clutch pack 33, including a plurality of outer friction discs 65, and a plurality of inner friction discs 67. The outer discs 65 are in splined engagement with the housing 25, by means of a set of internal splines 69 formed about the inner surface of the housing 25. The inner friction discs 67 are in splined engagement with the set of splines 60 on the output shaft 19. Although flat friction discs are illustrated and described herein, it should be understood that the invention is not so limited, and various other friction devices could be used, such as cone-shaped members. Therefore, as used hereinafter, and in the appended claims, the term "disc" will be understood to mean and include all such suitable friction devices.

Although not an essential feature of the present invention, each of the friction discs 65 and 67 is provided with a suitable friction material, preferably a pyrolytic carbon friction material, made in accordance with the teachings of U.S. Pat. No. 4,700,823, assigned to the assignee of the present invention and incorporated herein by reference. It should be understood by those skilled in the art that, when the ball ramp actuator 31 is in its neutral position, and the clutch pack 33 is "disengaged", the friction discs 65 and 67 may be literally disengaged, in the sense of not even touching each other, but more likely, will be touching each other, and able to transmit some torque, but substantially less than the maximum torque which can be transmitted through the clutch pack 33.

Each of the inner friction discs 67 preferably defines a plurality of circular openings 71, and immediately forward of the bearing set 27, and surrounding the output shaft 19 is a spring seat member 73. Seated against the member 73, and extending through the aligned circular openings 71 in the inner discs 67 is a plurality of coiled compression springs 75, the forward ends of which are seated against the back side of the second ramp plate 52. The function of the springs 75, collectively, is to bias the second ramp plate 52 forwardly (to the left in FIG. 2), tending to return the ball ramp actuator 31 toward its neutral position.

Operation

In operation, and under normal theoretical driving conditions, the front drive wheels 11 and the rear drive wheels 23 are all rotating at substantially the same speed, and therefore, the input shaft 15 and output shaft 19 are rotating at the same speed. In this theoretical, normal operating condition, the ball ramp actuator 31 remains in its neutral position, as shown in FIG. 3, the input coupling member 35 and output coupling member 43 rotate at the same speed, and the clutch pack 33 is in its "disengaged" condition, as that term was explained previously. In this condition, the entire center differential device 17 rotates substantially as a unit.

If the front drive wheels 11 lose traction, and begin to spin, or otherwise overspeed the rear wheels 23, the input shaft 15 and housing 25 will begin to rotate faster than the output shaft 19. When this occurs, the viscous coupling 29 operates in much the same way as a typical viscous coupling, i.e., with the input rotating faster than the output, a certain amount of torque is transmitted from the input coupling member 35 to the output coupling member 43, by means of viscous shear drag. It is one important aspect of the present invention that the use of the viscous coupling 29 makes the center differential device 17 "speed sensitive", i.e., the amount of torque transmitted to the output coupling member 43 is generally proportional to the slip speed, as that term was explained previously, which, in turn, is representative of the amount of slip of the front drive wheels 11. The amount of torque which is transmitted to the output coupling member 43 is then transmitted to the first ramp plate 51.

The use of the viscous coupling 29 to initiate ramping of the ball ramp actuator 31 has an additional benefit. As is well known to those skilled in the viscous clutch art, transmitting torque by viscous shear drag inherently provides a "damping" or "cushioning" effect, such that there will be no harsh or sudden engagement, as the device begins to transfer torque (or begins to transfer substantially more torque) to the rear wheels 23. In other words, the device 17 of the invention provides a much softer engagement than does the typical prior art system.

In accordance with another important aspect of the invention, the ball ramp actuator 31 differs somewhat from many ball ramp actuators known in the prior art. Typically, those used in the prior art are responsive to any relative rotation between the ramp plates, and thus, are in effect "position sensitive". However, in the present invention, because of the biasing force of the springs 75, it takes a certain amount of torque applied to the first ramp plate 51 to achieve a certain amount of relative rotational displacement of the plates 51 and 52, and thus, a corresponding amount of axial movement of the second ramp plate 52, and a corresponding amount of loading of the clutch pack 33. In other words, the greater the amount of slip of the front drive wheels 11, the greater will be the slip speed in the viscous coupling 29, and the greater will be the torque transmitted to the first ramp plate 51, and the greater will be the amount of loading of the clutch pack 33, which in turn, will result in a greater amount of torque being transmitted through the output shaft 19 to the rear drive wheels 23.

An important benefit of the viscous coupling 29 comprising a self-contained unit is that there is a fixed (axially) wall member adjacent the ball ramp device 31, providing a solid, fixed reaction member against which the ball ramp device exerts a thrust force as the ramp plates 51 and 52 begin to rotate relative to each other. Furthermore, the axially fixed housing 39 makes it possible to provide the rolling type thrust bearing 55 between the housing 39 and the ramp plate 51. The result of this arrangement is an actuator having a very low level of friction, and therefore, very little hysteresis, such that there is a desirable predictability in the actuation of the device which provides for better handling and steering of the vehicle.

Thus, the center differential device 17 of the present invention provides a drive line arrangement wherein, under normal driving conditions, substantially all of the driving torque is transmitted to the front drive wheels 11, and little or no (as desired) torque is transmitted to the rear drive wheels 23, but as soon as the front drive wheels 11 begin to slip, drive torque is automatically (with no driver intervention or external controls) transmitted through the output shaft 19 to the rear drive wheels 23, wherein the amount of torque is proportional to the amount of slip of the front drive wheels 11. It should be apparent to those skilled in the art that the device 17 could be designed, within the scope of the present invention, such that even when no substantial slip of the front drive wheels 11 is occurring, some intermediate amount of torque is being transmitted to the rear drive wheels 23. One way of doing this would be simply to apply a predetermine preload or bias to the clutch pack 33, so that there would be a predetermined amount of torque transmission from the input shaft 15 to the output shaft 19, even in the absence of any slip speed within the viscous coupling 29.

The arrangement of the device 17 of the invention permits the full axial travel of the ball ramp device 31, thus permitting the use of smaller ramp angles, which in turn, provides for greater torque multiplication. As a result, even at relatively low slip speeds, it is possible to generate a relatively high torque, if desired, which provides a "limp home" capability in the event of failure of the front drive mechanism. Another important result of the relatively high torque capability is the relatively low slip horsepower which is generated, and therefore, the relatively small amount of heat which must be dissipated in order for the device to be durable, and without significant reduction in fuel economy.

From the foregoing description, it should be apparent to those skilled in the art that the relationship between the amount of wheel spin of the front drive wheels 11 (or the slip speed within the viscous coupling 29) is related to the amount of torque transmitted to the output shaft 19, but that such relationship depends upon a number of factors including the viscosity of the fluid in the viscous coupling 29, the clearances between the lands and grooves 45, the ramp angles of the first and second ramp surfaces 61 and 62, the clearances between the adjacent outer friction discs 65 and inner friction discs 67, and the biasing force of the springs 75. It is believed to be within the ability of those skilled in the art to select appropriate values for each of the factors noted above to achieve the desired relationship of torque on the output shaft 19 to slip of the front drive wheels 11.

Furthermore, it is also believed to be within the ability of those skilled in the art to design the friction discs 65 and 67, and to select any appropriate friction material to be applied thereto, in view of the manner of operation of the device 17. For example, if the clutch pack 33 is truly disengaged (transmitting no substantial torque) during normal driving conditions, it may be sufficient to use plain steel discs. On the other hand, if the device 17 is designed such that "disengaged" means that, for example, 30% of full torque will be transmitted to the output shaft 19 during normal driving conditions, then it will be more important to provide a suitable friction material capable of withstanding relatively high temperatures in continuous slipping conditions, such as the pyrolytic carbon friction material mentioned previously.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A center differential device of the type including an input shaft adapted to receive input torque, at a speed of rotation representative of the speed of rotation of a pair of primary drive wheels, an output shaft adapted to provide driving torque to a pair of secondary drive wheels, and a clutch pack including at least a first friction disc fixed to rotate with said input shaft, and at least a second friction disc fixed to rotate with said output shaft, and means operable to move said friction discs between a disengaged position and an engaged position; characterized by:

(a) said means operable to move said friction discs comprises a cam ramp actuator including first and second ramp plates, and a plurality of cam members, each operably disposed between said first and second ramp plates, and in engagement with first and second ramp surfaces, respectively;

(b) said second ramp plate being disposed axially adjacent said friction discs and being operable to move said friction discs toward said engaged position, said second ramp plate being fixed to rotate with said output shaft;

(c) said means operable to move said friction discs further comprising a viscous coupling including an input coupling member fixed to rotate with said input shaft, and an output coupling member;

(d) said output coupling member being fixed to rotate with said first ramp plate, whereby, any speed difference between said input and output shafts will result in a corresponding slip speed between said input and output coupling members, thus generating a viscous shear torque representative of said slip speed, said viscous shear torque being applied to said first ramp plate to displace said cam ramp actuator from a neutral position to a clutch actuating position; and (e) said viscous coupling including a housing member cooperating with one of said input and output coupling members to define a viscous shear chamber, said output coupling member being disposed in said viscous shear chamber and including a shaft portion extending axially through said housing member and being in rotational engagement with said first ramp plate.

2. A center differential device as claimed in claim 1, characterized by said primary drive wheels comprising front drive wheels, and said secondary drive wheels comprising rear drive wheels.

3. A center differential device as claimed in claim 1, characterized by said device including housing means fixed to rotate with said input shaft, said input coupling member and said first friction disc being fixed to said housing means.

4. A center differential device as claimed in claim 1, characterized by said device further comprising biasing means operable to bias said cam ramp actuator toward said neutral position, whereby the relationship of the torque transmitted to said output shaft and said slip speed within said viscous coupling is a function of the biasing force of said biasing means.

5. A center differential device as claimed in claim 1, characterized by said first and second ramp surfaces defining first and second detents, respectively, whereby said viscous shear torque required to displace said cam ramp actuator from said neutral position represents at least a predetermined minimum slip speed of said viscous coupling.

6. A differential device of the type including an input shaft adapted to receive input torque from a source of torque, an output shaft adapted to provide driving torque to an output device, and a clutch pack including at least a first friction disc fixed to rotate with said input shaft, and at least a second friction disc fixed to rotate with said output shaft, means operable to move said friction discs between a disengaged position and an engaged position comprising a cam ramp actuator including first and second ramp plates, and a plurality of cam members, each operably disposed between said first and second ramp plates, and in engagement with first and second ramp surfaces, respectively; said second ramp plate being disposed axially adjacent said friction discs and being operable to move said friction discs toward said engaged position, said means operable to move said friction discs further comprising a viscous coupling including an input coupling member fixed to rotate with said input shaft, and an output coupling member; characterized by:

(a) said viscous coupling comprising a housing member, fixed to rotate with said input coupling member, and being disposed axially between said output coupling member and said first ramp plate;

(b) said output coupling member being fixed to rotate with said first ramp plate, whereby, any speed difference between said input and output shafts will result in a corresponding slip speed between said input and output coupling members, thus generating a viscous shear torque representative of said slip speed, said viscous shear torque being applied to said first ramp plate to displace said cam ramp actuator from a neutral position to a clutch actuating position.

7. A differential device of the type including an input shaft adapted to receive input torque from a source of torque, an output shaft adapted to provide driving torque to an output device, and a clutch pack including at least a first friction disc fixed to rotate with said input shaft, and at least a second friction disc fixed to rotate with said output shaft, means operable to move said friction discs between a disengaged position and an engaged position comprising a cam ramp actuator including first and second ramp plates, and a plurality of cam members, each operably disposed between said first and second ramp plates, and in engagement with first and second ramp surfaces, respectively; said second ramp plate being disposed axially adjacent said friction discs and being operable to move said friction discs toward said engaged position, said means operable to move said friction discs further comprising a viscous coupling including an input coupling member fixed to rotate with said input shaft, and an output coupling member; characterized by:

(b) said viscous coupling comprising a housing member, fixed to rotate with said input coupling member, and being disposed axially between said output coupling member and said first ramp plate;

(c) said output coupling member being fixed to rotate with said first ramp plate, whereby, any speed difference between said input and output shafts will result in a corresponding slip speed between said input and output coupling members;

(d) means biasing said second ramp plate toward said first ramp plate, thereby biasing said cam ramp actuator toward a neutral position: and (e) thrust bearing means disposed axially between said housing member and said first ramp plate, whereby said means operable to move said friction discs comprises a relatively low friction means.

* * * * *